United States Patent
Leppänen et al.

(10) Patent No.: US 9,571,604 B2
(45) Date of Patent: Feb. 14, 2017

(54) METHOD AND APPARATUS FOR DISTRIBUTING COLLABORATIVE CONTENT

(71) Applicant: Nokia Technologies Oy, Espoo (FI)

(72) Inventors: Tapani Leppänen, Tampere (FI); Timo Aaltonen, Tampere (FI); Ari Aarnio, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 43 days.

(21) Appl. No.: 14/411,270

(22) PCT Filed: Jul. 3, 2013

(86) PCT No.: PCT/FI2013/050729
§ 371 (c)(1),
(2) Date: Dec. 24, 2014

(87) PCT Pub. No.: WO2014/006272
PCT Pub. Date: Jan. 9, 2014

(65) Prior Publication Data
US 2015/0326689 A1    Nov. 12, 2015

Related U.S. Application Data

(60) Provisional application No. 61/668,265, filed on Jul. 5, 2012.

(51) Int. Cl.
*H04L 29/08*    (2006.01)
*H04W 24/02*    (2009.01)
(Continued)

(52) U.S. Cl.
CPC ........... *H04L 67/303* (2013.01); *G06Q 10/101* (2013.01); *G06Q 30/0251* (2013.01); *H04W 24/02* (2013.01); *H04L 67/24* (2013.01)

(58) Field of Classification Search
CPC ....... H04L 67/303; H04L 67/24; H04W 24/02; G06Q 30/0251; G06Q 10/101
See application file for complete search history.

(56) References Cited

U.S. PATENT DOCUMENTS 5,103,392 A    4/1992   Mori
7,505,760 B2   3/2009   Hurst et al.
(Continued)

FOREIGN PATENT DOCUMENTS

EP    1249969 A2    10/2002
JP    H0464129 A     2/1992
(Continued)

OTHER PUBLICATIONS

International Search Report and Written Opinion received for corresponding Patent Cooperation Treaty Application No. PCT/FI2013/050729, dated Sep. 26, 2013, 14 pages.
(Continued)

*Primary Examiner* — Ajay Cattungal
(74) *Attorney, Agent, or Firm* — Ditthavong & Steiner, P.C.

(57) ABSTRACT

An example approach for enabling content to be distributed based on user and device related execution criteria is described. A collaboration platform determines one or more execution criteria for at least one device based, at least in part, on presence information, capability information, characteristic information, or a combination thereof of at least one other device within proximity of the at least one device. The collaboration platform also determines an execution of the one or more content items based, at least in part, on one or more execution criteria associated with the one or more content items.

21 Claims, 11 Drawing Sheets

(51) Int. Cl.
*G06Q 30/02* (2012.01)
*G06Q 10/10* (2012.01)

(56) References Cited

U.S. PATENT DOCUMENTS

| | | | |
|---|---|---|---|
| 7,730,216 | B1 | 6/2010 | Issa et al. |
| 8,060,399 | B2 | 11/2011 | Ullah |
| 8,886,782 | B2 | 11/2014 | Lucero et al. |
| 2003/0023578 | A1 | 1/2003 | Durand et al. |
| 2006/0009155 | A1 | 1/2006 | Paalasmaa et al. |
| 2006/0161563 | A1* | 7/2006 | Besbris .......... G06F 9/445 |
| 2006/0277312 | A1 | 12/2006 | Hirsch |
| 2007/0162392 | A1 | 7/2007 | McEnroe et al. |
| 2009/0106028 | A1* | 4/2009 | Dhanakshirur ....... G10L 15/065 704/270.1 |
| 2009/0125971 | A1 | 5/2009 | Belz et al. |
| 2010/0077017 | A1 | 3/2010 | Martinez et al. |
| 2011/0196925 | A1* | 8/2011 | Hans .......... G06Q 30/02 709/204 |
| 2011/0235577 | A1 | 9/2011 | Hintermeister et al. |
| 2011/0250895 | A1* | 10/2011 | Wohlert .......... H04W 4/16 455/445 |
| 2011/0320819 | A1 | 12/2011 | Weber et al. |
| 2012/0149309 | A1* | 6/2012 | Hubner .......... H04W 4/023 455/67.11 |
| 2012/0278634 | A1* | 11/2012 | Luukkala .......... H04L 63/0442 713/189 |
| 2013/0103844 | A1* | 4/2013 | Bulut .......... H04L 67/145 709/228 |

FOREIGN PATENT DOCUMENTS

| | | |
|---|---|---|
| WO | 2004004395 | 1/2004 |
| WO | 2004/082303 A2 | 9/2004 |
| WO | 2004/090667 A2 | 10/2004 |

OTHER PUBLICATIONS

Super Street Figher IV 3D Edition. Game Overview [online]. Nintendo 2011. Retrieved from the Internet: <URL:http://http://www.nintendo.com/games/detail/-XkbTGLfYK9tbeL1dG0D5LbyATIn3CZQ>.

Nintendo 3DS Operations Maual. Nintendo, 2011 [online] Retrieved from the Internet: <URL:http:www.nintendo.com/consumer/downloads/CTR_ops_eng.pdf>.

"Superdistribution", Wikipedia, Retrieved on Feb. 23, 2016, Webpage available at : https://en.wikipedia.org/wiki/Superdistribution.

Mouawad et al., "Collaborative Content Distribution Over Wireless Networks With Minimized End-To-End Distribution Delays", IEEE 17th International Conference on Telecommunications, Apr. 4-7, 2010, pp. 589-593.

Jacobsson et al.,"Push!Music: Intelligent Music Sharing on Mobile Devices", The 7th International Conference on Ubiquitous Computing, 2005, 2 pages.

Extended European Search Report received for corresponding European Patent Application No. 13813162.8, dated Jan. 20, 2016, 4 pages.

* cited by examiner

100

306

300

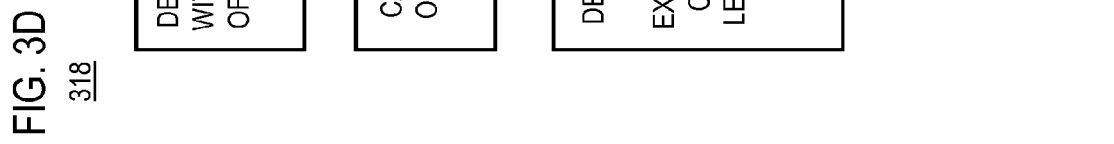
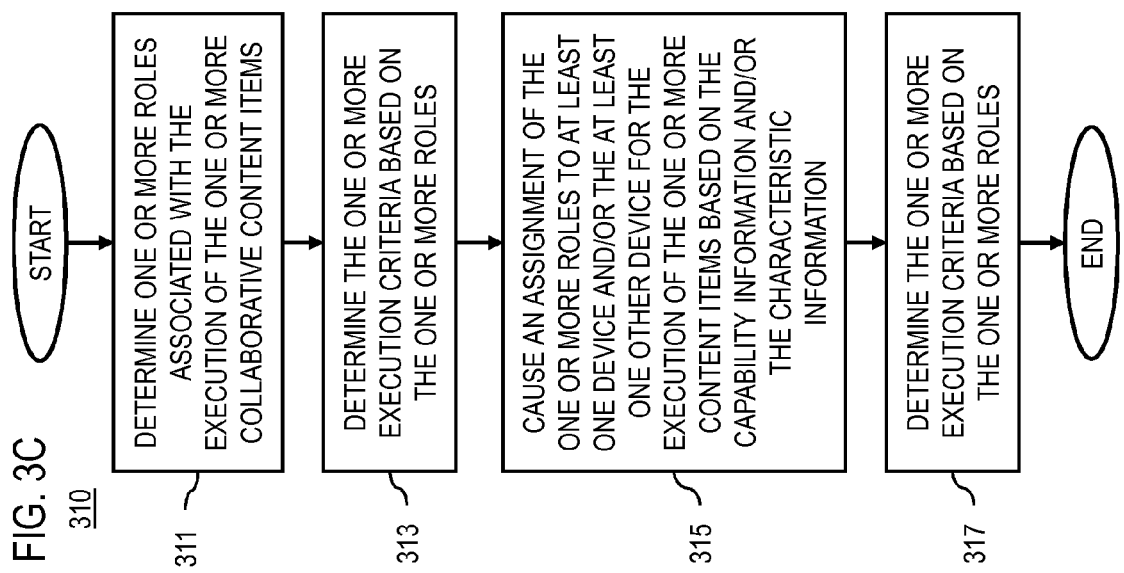

METHOD AND APPARATUS FOR DISTRIBUTING COLLABORATIVE CONTENT

RELATED APPLICATION

This application was originally filed as PCT Application No. PCT/FI2013/050729 filed Jul. 3, 2013 which claims priority benefit from U.S. Provisional Application No. 61/668,265 filed Jul. 5, 2012.

BACKGROUND

Service providers are continually challenged to deliver value and convenience to consumers by providing compelling network services and advancing the underlying technologies. One area of interest has been the development of services and technologies for sharing content between device users. Many content providers recognize the significant value of employing social networking, viral marketing and other word-of-mouth techniques as a means of distributing content. By way of example, providers may direct targeted advertisement content and offers to groups of people (consumers) based on their common interests and affiliations. Still further, digital content providers may employ superdistribution to facilitate the active, uninhibited sharing of content by individuals. Unfortunately, content providers are limited in their ability to permit the sharing of content in a manner that enforces group and/or device collaboration as criteria for affecting execution (e.g., playback) of the content.

SOME EXAMPLE EMBODIMENTS

Therefore, there is a need for an approach for enabling content to be distributed based on user and device related execution criteria.

According to one embodiment, a method comprises determining one or more execution criteria for at least one device based, at least in part, on presence information, capability information, characteristic information, or a combination thereof of at least one other device within proximity of the at least one device. The method also comprises causing, at least in part, an association of the one or more execution criteria with one or more content items. The method further comprises determining an execution of the one or more content items based, at least in part, on the one or more execution criteria.

According to another embodiment, an apparatus comprises at least one processor, and at least one memory including computer program code for one or more computer programs, the at least one memory and the computer program code configured to, with the at least one processor, cause, at least in part, the apparatus to determine one or more execution criteria for at least one device based, at least in part, on presence information, capability information, characteristic information, or a combination thereof of at least one other device within proximity of the at least one device. The apparatus is also caused to cause, at least in part, an association of the one or more execution criteria with one or more content items. The apparatus is further caused to determine an execution of the one or more content items based, at least in part, on the one or more execution criteria.

According to another embodiment, a computer-readable storage medium carries one or more sequences of one or more instructions which, when executed by one or more processors, cause, at least in part, an apparatus to determine one or more execution criteria for at least one device based, at least in part, on presence information, capability information, characteristic information, or a combination thereof of at least one other device within proximity of the at least one device. The apparatus is also caused to cause, at least in part, an association of the one or more execution criteria with one or more content items. The apparatus is further caused to determine an execution of the one or more content items based, at least in part, on the one or more execution criteria.

According to another embodiment, an apparatus comprises means for determining one or more execution criteria for at least one device based, at least in part, on presence information, capability information, characteristic information, or a combination thereof of at least one other device within proximity of the at least one device. The apparatus also comprises means for causing, at least in part, an association of the one or more execution criteria with one or more content items. The apparatus further comprises means for determining an execution of the one or more content items based, at least in part, on the one or more execution criteria.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3D are flowcharts of processes for enabling content to be distributed based on user and device related execution criteria, according to various embodiments;

DESCRIPTION OF SOME EMBODIMENTS

Examples of a method, apparatus, and computer program for enabling content to be distributed based on user and device related execution criteria are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
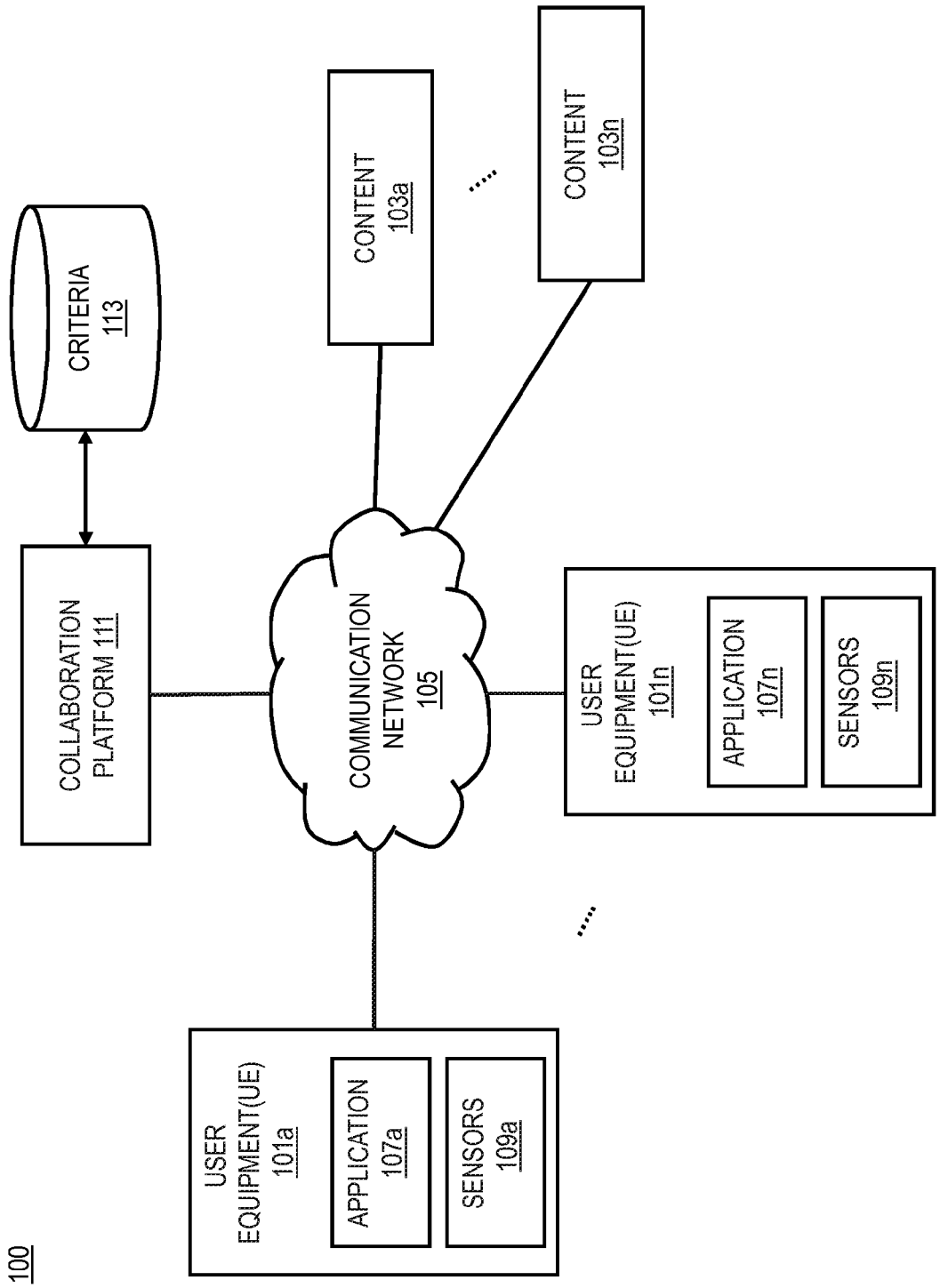
FIG. 1 is a diagram of a system for enabling content to be distributed based on user and device related execution criteria, according to one embodiment.

FIG. 1 is a diagram of a system for enabling content to be distributed based on user and device related execution criteria, according to one embodiment. By way of example, the system 100 includes a collaboration platform 111 configured to support the sharing of content 103a-103n, referred to collectively herein as content 103, among user devices (e.g., user equipment 101a-101n). Hence, the collaboration platform 111 supports content sharing and distribution, including content forwarding, content synchronization and sequencing and other known mechanisms for facilitating the execution of the same content on different UE 101. Furthermore, the collaboration platform 111 facilitates execution of content 103 based, at least in part, on criteria defined by a provider of the content, a provider of the collaboration platform 111, or a combination thereof. For the purpose of explanation, the user equipment 101a-101n (referred to collectively herein as user equipment (UE) 101) may be implemented as any communications enabled device for interacting with the platform 111 via a communication network 105.

As noted previously, content providers recognize the significant value of enlisting the general public to distribute their content. By way of example, content may include any media capable of being digitally rendered or executable via a computing device, including digital print, games, video and audio. Furthermore, the content may pertain to various subject matters or be devised to appeal to specific target audiences for accomplishing different execution purposes. Hence, the content may be devised for commercial and/or business purposes, be informational or educational, provide entertainment, etc.

In some instances, content providers enable the direct accessing and sharing of their content by way of a word-of-mouth or direct marketing schemes. One such scheme supporting distribution of digital content is superdistribution, wherein users are encouraged to distribute content without any digital rights management limitations. As such, superdistribution is known as a highly efficient means of disseminating content to large quantities of people while leveraging the influence of the individual distributors.

Unfortunately, the open/uninhibited nature of the above described approaches also limits the capacity of content providers to influence how and when their content is shared. For example, content providers have little to no influence over the number of people to which content can be shared. Moreover, the providers have no effective means of controlling the timing and/or sequencing of execution of their content. Still further, content providers currently have no means of ensuring their content is executed by devices best suited for maximizing user enjoyment, i.e., based on device, software, sound or image processing capabilities of a recipient device.

To address this problem, a system 100 of FIG. 1 introduces the capability to facilitate the execution of content on the basis of execution criteria 113. The execution criteria 113 may specify a characteristic condition, a contextual condition of one or more users and/or respective user equipment (UE) 101 for interacting with the content, a device capability condition, or a combination thereof. By way of example, a characteristic condition specified as execution criteria may include a device manufacturer type or model, a service provider type, a network type, etc. As another example, a device capability condition may include an audio and/or video processing capability of the UE 101, a graphic rendering capability, a processing capability, a network interface capability, data storage and access capability or the like. It is noted, in certain embodiments, that the capability conditions and characteristic conditions may be directly or indirectly related conditions depending on the relationship between the communications network 105 provider and the provider of the UE 101. The collaboration platform 111 therefore operate as an intermediary platform, hosted solution, or the like for facilitating criteria based content distribution according to different arrangements and business models accordingly.

Still further, the execution criteria 113 may be based on contextual information regarding a user of UE 101, including the distributor of the shared content, a target recipient of the shared content, or a combination thereof. The contextual criteria may also pertain to one or more contextual conditions associated with UE 101 of said users. For instance, the collaboration platform 111 may receive and subsequently process context data such as position information, location information, presence information, device operational status information or the like. Still further, the platform 111 may process profile and/or subscription information associated with the user.

In certain embodiments, the execution criteria 113 must be fulfilled in order to permit execution of content 103—provided by a service provider—at requesting and/or receiving user equipment 101. For example, in the case of video content, the criteria 113 may indicate specific conditions (related to the above) be fulfilled to permit partial or full execution (e.g., playback) of the video. As another example, in the case of content relating to an interactive game, the criteria 113 may specify that at least four device users be within a predetermined proximity of one another to permit game play. As a further condition, at least one of the devices may be required to feature a certain graphics processing capability. Hence, the execution criteria 113 may be generated as a combination of one or more of the above described presence, capability or characteristic information conditions by a provider of content 103a-103n, referred to herein collectively as content 103.

In certain embodiments, the execution criteria 113 may also specify one or more roles required to be fulfilled by one or more UE 101 for which content 103 is to be executed (e.g., played or viewed). The role may be defined, for example, on the basis of the type of content to be executed. Under this scenario, for instance, a multiplayer game may specify that of the three required participants, one of them is to play the role of leader of the group within the game. As another example, the role may be defined on the basis of which user or UE 101 is responsible for initiating distribution/sharing of the content 103. Under this scenario, the roles are assigned according to the sequence of entry of users within range of each other or based on a level or ranking associated with members of a common social network. It is noted that the role assignment may also correspond to a subscription and/or membership agreement by the user of UE 101 with a provider of the collaboration platform 111 or a provider of the content 103. Under this scenario, for example, at least one of the users to which content is to be distributed/shared may be required to be a member in good standing with the provider(s).

In certain embodiments, distribution of content 103 to one or more UE 101 is based, at least in part, on fulfillment of a proximity and/or presence condition of the one or more UE 101. For example, execution criteria 113 for an interactive slideshow may specify that at least a first UE 101a and second UE 101b be within proximity of one another to permit execution of the slideshow. In addition, execution of content 103 may be further based, at least in part, on fulfillment of a capability or characteristic condition. For example, a playback requirement for a movie may be that at least one UE 101a have the ability to render three-dimensional content while another UE 101b be associated with a specific manufacturer or network provider. For the purpose of illustration, any group of UE 101 that meets the requirements is referred to herein as an established group.

Of note, the collaboration platform 111 facilitates the gathering and subsequent interpreting of presence information, capability information, characteristic information, or a combination thereof for each UE 101. This is carried out based on data collected by various sensors 109a-109n (referred to herein collectively as sensors 109) of the UE 101 or on the basis of user profile information pertaining to a user of UE 101. For example, context information indicating the current location, position or presence of a user may be collected by sensors 109 and subsequently/periodically transmitted to the collaboration platform 111. As another example, characteristic and capability information regarding UE 101 may be determined based on the passage of device type identification, model identification, etc. Still further, user information and/or device information may be determined based on processing of a user identifier, subscriber identity module (SIM) card data, carrier identification information or other data as cross-referenced against user profile information.

In certain embodiments, the content provider may access a configuration interface of the collaboration platform 111 for defining the criteria. Under this scenario, the content provider may specify a particular user condition, device condition, contextual condition, network condition, group interaction condition, or the like for defining a set of criteria 113 in association with specific content 103. In addition, the content provider may specify a particular role of a user for defining how different users interact with one another as they execute the content. In certain embodiments, the execution criteria 113 may be stored as a unique data file for retrieval by the collaboration platform 111 in connection with specific content 105. In this case, the content 103 may include a reference pointer to a corresponding data file.

In certain embodiments, respective UE 101a-101n may be configured with applications 107a-107n for supporting the access, execution and rendering of content 103. The applications 107a-107n, referred to herein collectively as applications 107, may be a browser, a widget or a standalone application capable of interacting with the collaboration platform 111 via the communication network 105. By way of the application 107, the collaboration platform 111 may generate a user interface at UE 101 for supporting concurrent content execution.

Under this scenario, the collaboration platform 111 may cause the rendering of user interface elements, including action buttons, menus and other graphics primitives. Each user interface element may be associated with a specific user input, response, or action for enabling a user to interact with content 103. By way of example, an action button for initiating sharing of content between different UE 101 may be presented via the application 107. As another example, an action button for initiating playback of content at multiple devices in response to fulfillment of execution criteria 113 may be presented to a display of at least one of the participating UE 101. It is noted that the user interface elements presented to a user may be defined by the content 103, while a specified user input is monitored by the collaboration platform 111 accordingly to ensure criteria based control and execution of the content 103.

In addition, the user may be presented with status information for indicating whether or not the required execution criteria 113 have been fulfilled. The status information may be rendered to a display of a device as one or more user interface elements, including icons, indicators and the like. By way of example, the status information may indicate how many additional devices are required to render execution of content 103, the roles to be fulfilled, etc. It is noted that the status information may also be rendered to the user interface as textual content for indicating the remaining requirements.

Still further, in certain embodiments, the collaboration platform 111 also manages the sequencing, staging and synchronizing of content across UE 101 based on fulfillment of criteria 113. By way of example, the sequencing, staging and synchronization may correspond to any means of timing and arranging of the concurrent accessing, rendering or playback of content (if required). Under this scenario, video content wherein multiple different users are required to permit execution of the video may be appropriately distributed and timed for concurrent playback at each UE. This ensures, for example, that each user consumes the content at the same time. Still further, when an additional UE 101 is within proximity of content currently in execution, the platform 111 may match the current point of play of the video with the new UE 101.

In instances where concurrent execution is not required, i.e., based on the requirements 113, the collaboration platform 111 may also facilitate sequential passage of content information from one UE 101 to another. This may include passage of a token from one UE 101 to another for indicating a current control or mode of operation of the content at a given UE within an established group—i.e., a group of devices interacting on the basis of fulfilled criteria requirements. Table 1 presents different content execution and distribution models/schemes capable of being performed by the collaboration platform 111. It is noted, however, that the platform 111 may be configured and/or adapted to account for different models.

TABLE 1

Peer-to-peer model: Each UE 101 within a group of UE in proximity has a role that is defined by the execution criteria 113. The initiating UE 101 starts execution of the content and when finished, passes a token to the next device as defined by the content under execution. Upon receipt, the next UE 101 then executes the content according to its defined role and passes the token to the next UE 101 of the group. Per this model, the token can be passed to different UE 101 for enabling concurrent or sequential execution of the content accordingly.
Centralized model: An initiating UE or possibly a central server, i.e., an internet node, orchestrates execution of content by passing the token to different UE 101 of a group in turn. By way of this approach, when a UE 101 has finished the execution, it sends an acknowledgement signal back to the orchestrator. The orchestrating node then sends the token to the next UE in turn. Per this model, the token can be passed to different UE 101 for enabling concurrent or sequential execution of the content accordingly.

Of note, actual distribution of content 103 may occur prior to or at the point of initial execution of the content 103 by at least one of the UE 101 of a defined group. Under this scenario, each participating UE 101 gets a full copy of the content 103. Alternatively, the content 103 can be copied and distributed to each participating device during or after the point of initial execution, i.e., after a portion of a video has already elapsed.

Also, as noted with respect to Table 1, a centralized server (not shown) may be configured to interact with the collaboration platform 111 and respective UE 101 to facilitate various content sharing, copying and/or distribution actions. In certain embodiments, after successful execution or distribution of content 103a-103n the initiating UE 101 informs the centralized server of this status. The status notification may include, for example, data for specifying details about the user(s), the content that was executed, the receiving UE 101, etc. Once collected, this data can be processed by the collaboration platform 111 to facilitate the recommending of additional content, e.g., targeted advertisements, coupons, discounts, etc., for related products or services related to the content.

In certain embodiments, the collaboration platform is configured to perform one or more of the following content sharing, distribution and execution tasks: (1) determining multiple UE 101 are within a predetermined proximity of one another; (2) determine the entry or loss of UE 101 from an established group of UE 101; (3) determine fulfillment of one or more execution criteria for one or more UE 101; (4) enable execution of the content 103 based on the fulfillment. It is noted that sharing of content among UE 101 may be enabled via short range communication such as Bluetooth or ad-hoc mesh networking.

As shown in FIG. 1, the system 100 comprises user equipment (UE) 101 having connectivity to the collaboration platform 111 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, collaboration platform 111 and providers of content 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
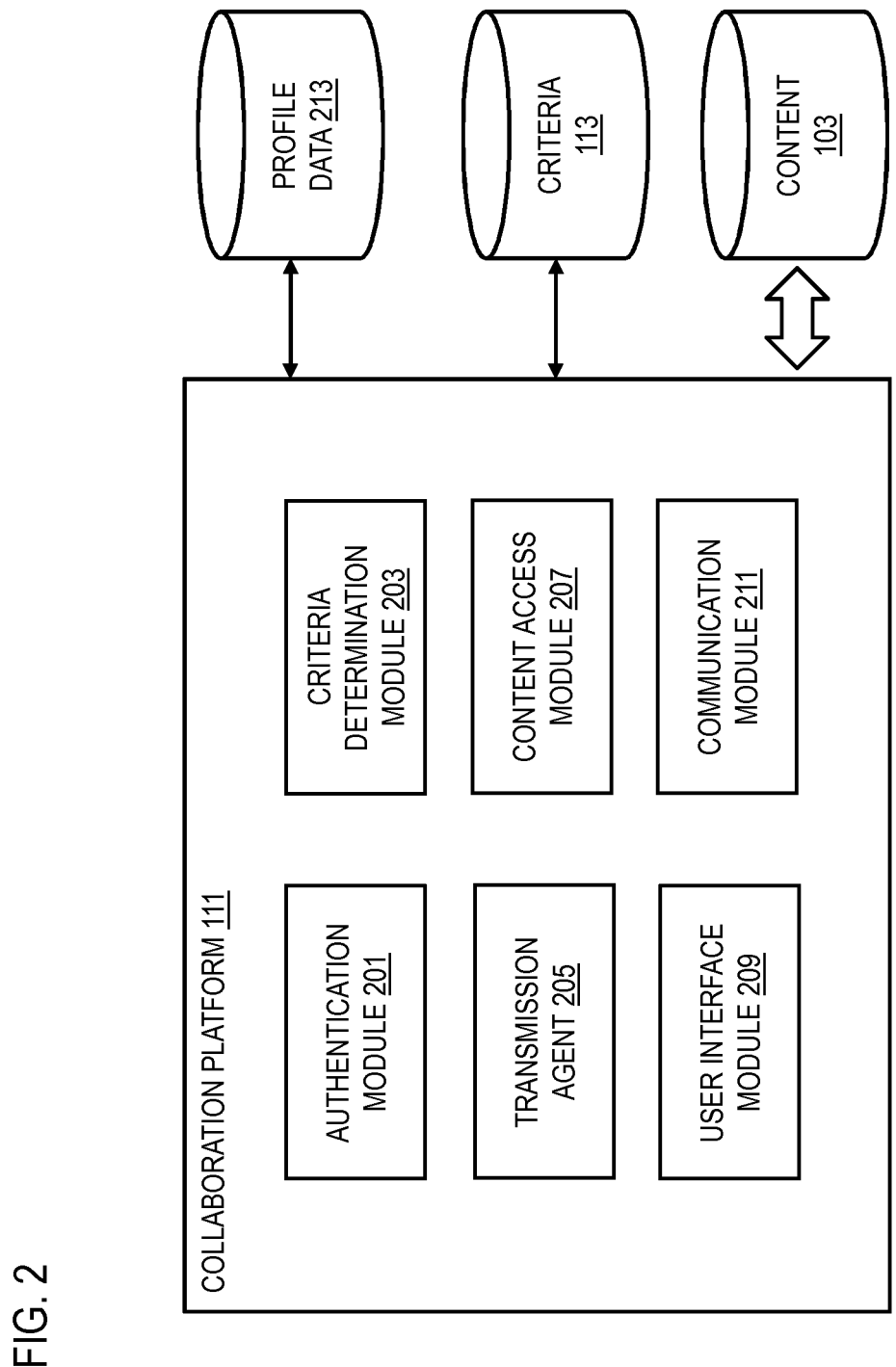
FIG. 2 is a diagram of the components of a collaboration platform, according to one embodiment.
Figure 3B:
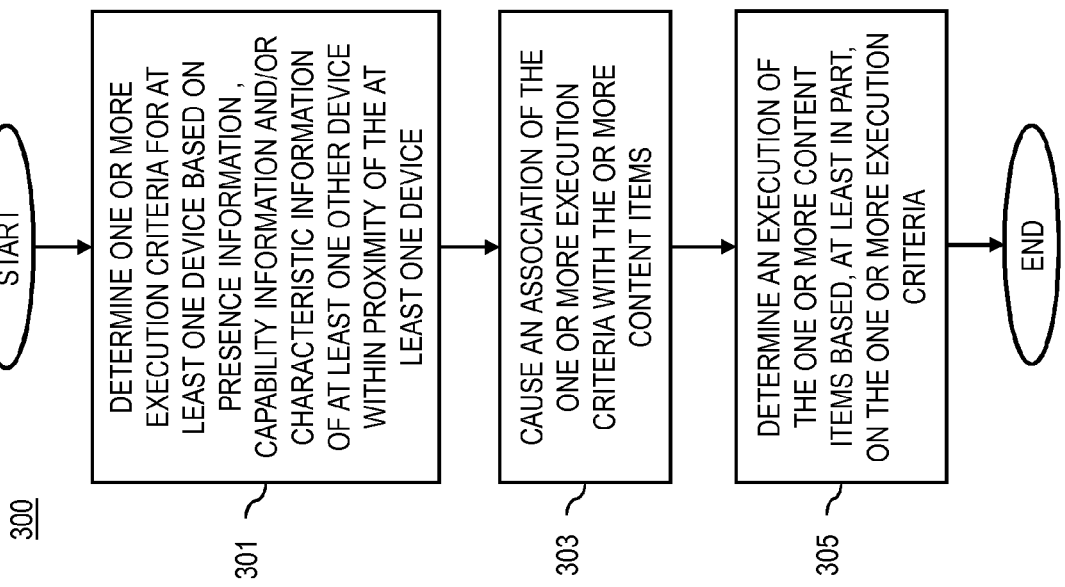
Figure 3A:
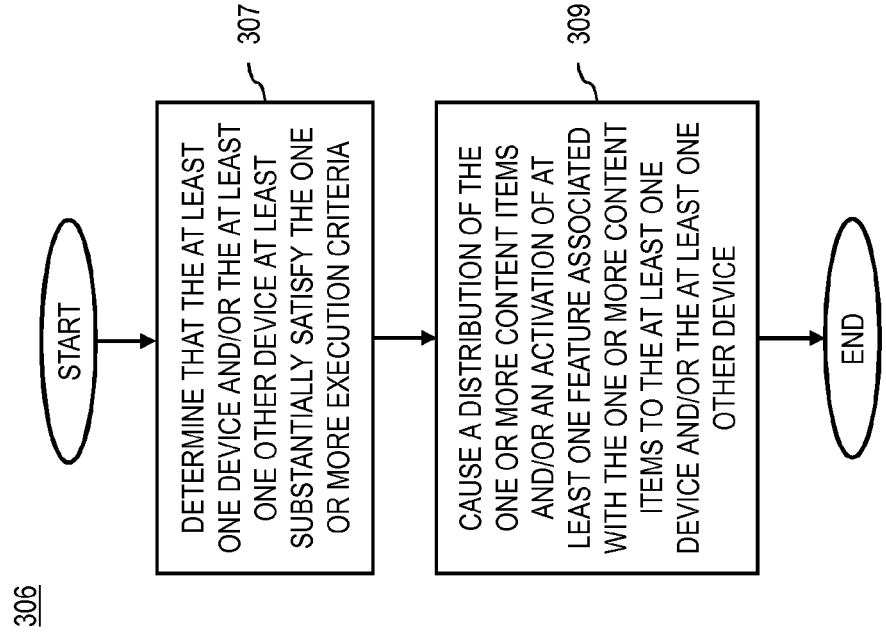

FIG. 2 is a diagram of the components of a collaboration platform, according to one embodiment. By way of example, the collaboration platform 111 includes one or more components for providing enabling content to be distributed based on user and device related execution criteria. It is contemplated that the functions of these components may be combined in one or more components or performed by other components of equivalent functionality. In this embodiment, the collaboration platform 111 includes an authentication module 201, a criteria determination module 203, a transmission agent 205, a content access module 207, a user interface module 209 and a communication module 211.

In addition, the collaboration platform 111 also maintains or accesses content 103 as received from content providers (e.g., advertisers, movie vendors, music vendors), execution criteria 113 for defining conditions for permitting execution of content 103 and profile information 213 related to various users and/or content provider subscribers of the platform 111. The modules 201-211 of the advertisement sharing platform 111 may access databases 103, 113 and 213 for performing various executable functions.

In one embodiment, an authentication module 201 authenticates users and user devices 101a-101n for interaction with the collaboration platform 111. By way of example, the authentication module 201 receives a request from a user of a device 101 to subscribe to the platform 111 for enabling criteria based sharing of content 103. The subscription process may include establishing one or more preferences regarding their content interests, i.e., for facilitating receipt of targeted content. The preferences and settings of the user may be stored in connection with profile information 213 for to the user. Of note, in certain instances, the initial authentication process may also involve the activation and/or downloading of an application 107 for viewing content via the user device 101.

Similarly, one or more content providers may also subscribe with the collaboration platform 111. The subscription may include specifying the network or file location of content 103 to be directed to users. In addition, the content provider may also specify criteria 107 for processing/interpreting the types of responses of a user to advertisement content 103. For example, the criteria may be stored in a data file, and used at the time of user interaction with content to determine fulfillment of a required execution condition, a request of the user to forward content 103, a request to initiate or stop execution, etc.

It is noted that for users and advertisement providers, the authentication module 201 enables the subscription procedure to be performed based on different subscription models. For example, in the case of a paid subscription model, the authentication module 201 may coordinate with a payment processing service to enable paid access to content 103. As another example, the authentication module 201 may further access a cloud based service for enabling seamless storing of various data sets (e.g., databases 103, 113, and 213), such as to support UE mobility. Under this scenario, the authentication module 201 facilitates a login and data sharing procedure via a cloud computing access protocol.

The authentication process performed by the module 201 may also include receiving and validating a login name and/or user identification value provided or established during subscription. The login name and/or user identification value may be received as input from UE 101 via a graphical user interface to the platform 111 (e.g., as enabled by the user interface module 209). Alternatively, the login procedure may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier.

In one embodiment, the criteria determination module 203 determines which criteria corresponds to particular content 103 queued for and/or requested to be executed by UE 101. For example, the criteria determination module 203 may process a header file or other data bit within a portion of the content 103 for determining a reference location of the corresponding execution criteria 113. In addition, the criteria determination module 203 also processes contextual information, characteristic information and capability information pertaining to at least one UE 101 to determine whether the corresponding execution criteria 113 have been fulfilled. By way of example, the criteria determination module 203 may process the contextual information to determine a presence of one UE within proximity to another. As another example, the criteria determination module 203 may determine that a number of UE are within proximity according to the established criteria 113. By processing capability and characteristic information, additional conditions pertaining to a UE 101, a provider of a UE 101, the provider of the content 103 or a provider of the communication network 105 may also be verified accordingly.

In one embodiment, the transmission agent 205 facilitates the transmission and subsequent execution of content 103 based on verification of criteria fulfillment by the criteria determination module 203. For example, the transmission agent 205 supports content sharing and distribution techniques, including content forwarding, content synchronization and sequencing and other known mechanisms for facilitating execution of the same content on different UE 101. Distribution of the content may be based on peer-to-peer communication or centralized node distribution in coordination with the communication module 211. Furthermore, the transmission agent 205 may interpret content execution parameters for supporting coordinated passage of tokens to UE 101 accordingly. As such, the transmission agent 205 and communication module 211 facilitate the sequencing, staging and synchronizing of content across UE 101 based on fulfillment of criteria 113.

In one embodiment, the content access module 207 retrieves content 103 corresponding to determined fulfillment of criteria 113. In addition, the content access module 207 is configured to retrieve content on demand, such as in response to a user request or periodically from a content provider. Of note, the criteria determination module 203 may call upon the content access module 207 for performing analysis of the contextual, characteristic or capability information gathered in association with UE 101.

In one embodiment, the user interface module 209 facilitates generation of different interfaces for enabling users and content providers to interact with the collaboration platform 111. This includes, for example, generation of a configuration interface for enabling content providers to input and/or define response criteria 107. Still further, the user interface module 209 may cause generation of a user interface for enabling rendering of content 103 to a display of UE 101. Under this scenario, the user interface module 209 also generates various user interface elements, such as action buttons, for facilitating user interaction with the content 103. By way of example, the user interface module 209 generates the user interface and various elements thereof via one or more application programming interfaces (APIs) or other function calls of the UE 101.

In one embodiment, a communication module 211 enables formation of a session over a network 105 between the collaboration platform 111 and the UE 101. By way of example, the communication module 211 executes various protocols and data sharing techniques for enabling collaborative execution between UE 101 (e.g., mobile devices, laptops, smartphones, tablet computers, desktop computers) and the platform 111. It is noted that the communication module 211 is also configured to support a browser session—i.e., the retrieval of content 103 as referenced by a resource identifier entered at the browser. As such, the browser session may support the accessing, playback, forwarding and other executions related to the content.

The above presented modules and components of the collaboration platform 111 can be implemented in hardware, firmware, software, or a combination thereof. Though depicted as a separate entity in FIG. 1, it is contemplated that the collaboration platform 111 may be implemented for direct operation by respective UEs 101*a*-101*n*. As such, the collaboration platform 111 may generate direct signal inputs by way of the operating system of the UE 101 for interacting with the application 107 and accessing content 103. In another embodiment, one or more of the modules 201-211 may be implemented for operation by respective UE 101, as a platform 111 or a combination thereof.

Figure 6:
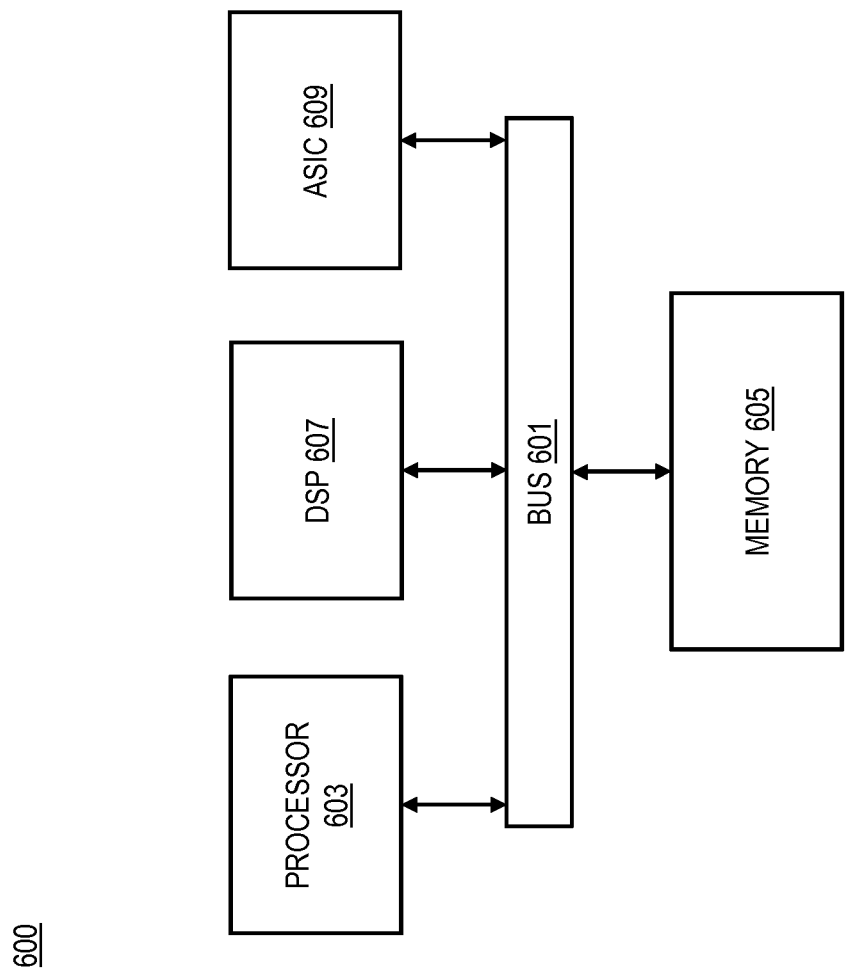
FIG. 6 is a diagram of a chip set that can be used to implement an embodiment of the invention.

FIGS. 3A-3D are flowcharts of processes for enabling content to be distributed based on user and device related execution criteria, according to various embodiments. In one embodiment, the collaboration platform 111 performs processes 300, 306, 310 and 318 and is implemented in, for instance, a chip set including a processor and a memory as shown in FIG. 6.

In step 301, the collaboration platform 111 determines one or more execution criteria for at least one device based on presence information, capability information and/or characteristic information of at least one other device within proximity of the at least one device. As mentioned previously, the presence information, capability information and/or characteristic information may be determined based on data collected by one or more sensors 109 of UE 101. Alternatively, the data may be based on cross-referencing of device and/or user identifier information against profile information for defining the capabilities or characteristics of a user and their corresponding UE.

In step 303, the collaboration platform 111 causes an association of the one or more execution criteria with the one or more content items. Per step 305, the platform 111 further determines an execution of the one or more content items based, at least in part, on the one or more execution criteria. The determined execution may include, for example, a playing/playback of the content, a stopping of the content, a pausing of the content or any other task to be carried out for permitting user interaction with the content 103.

In step 307 of process 306 (FIG. 3B), the collaboration platform 111 determines that the at least one device and/or the at least one other device at least substantially satisfy the one or more execution criteria. For example, in the case where the criteria 113 are a number of participants in a video game, the platform 111 maintains a count of the number of active group participants. Per step 309, the collaboration platform 111 also causes a distribution of the one or more content items and/or an activation of at least one feature associated with the one or more content items to the at least one device and/or the at least one other device. By way of example, various features associated with content 103 may be gradually enabled as additional criteria associated with the content are fulfilled. Under this scenario, a requirement of six participants for enabling execution of a multi-player video game may be partially played only up to the first two levels of the game with four available players.

In step 311 of process 310 (FIG. 3C), the collaboration platform 111 determines one or more roles associated with the execution of the one or more collaborative content items. In another step 313, the platform 111 also determines the one or more execution criteria based on the one or more roles. Still further, in step 315, the platform 111 causes an assignment of the one or more roles to at least one device and/or the at least one other device for the execution of the one or more content items based on the capability information and/or the characteristic information. Hence, the roles to be carried out may vary based on the content to be executed as well as the various capability and characteristic information determined in connection with UE 101. It is noted that one or more distribution rights associated with the one or more content items—e.g., as established by a content provider—are independent of the one or more execution criteria 113.

Per step 317, the platform 111 determines the one or more execution criteria based on the one or more roles. It is noted, therefore, that the roles and mode of interaction of users with content 103 may be established automatically by the platform 111. This is in contrast to user interaction models wherein a specific user must initiate and define the role. Rather, the content provider may establish a set of criteria in connection with execution of the content for controlling the mode and means of interaction of users and corresponding UE 101 that fulfill the established criteria 113. Furthermore, content to be distributed and subsequently executed may be directly associated with the user and/or UE 101 based on the role.

In step 319 of process 318 (FIG. 3D), the collaboration platform 111 determines status information with respect to a satisfaction of the one or more execution criteria. The status information may include, for example, a current number of UE 101 within proximity of one another, whether certain device capabilities are present, etc. In step 321, the platform 111 also causes a presentation of one or more representations of the status information. By way of example, when additional users are required to fulfill a proximity condition and/or participation condition, a notification message or icon for representing this requirement may be shown. Still further, the status information may include an indication of which of the one or more content items are available for access or a needed number of the at least one other device for satisfying the one or more execution criteria.

Per step 323, the collaboration platform 111 determines at least one token for coordinating execution of the one or more content items among the at least one device, the at least one other device, or a combination thereof. As mentioned previously, the token may enable peer-to-peer or centralized distribution and execution of the content 103. In addition, passage of a token from one UE to another may support the staging and synchronizing of content among devices.

FIGS. 4A-4D are diagrams of user interfaces utilized in the processes of FIGS. 3A-3D, according to various embodiments. For the purpose of illustration, the diagrams are described with respect to an exemplary use case of a user accessing and/or interacting with music video content via their mobile device 401. Per this use case, the user interacts with the content along with other users based on established execution criteria. It is noted that while the user interface depictions correspond to the process of collaborative distribution of content, the devices may be caused to present additional screens based on interaction of devices with the collaboration platform 111.

Figure 4A:
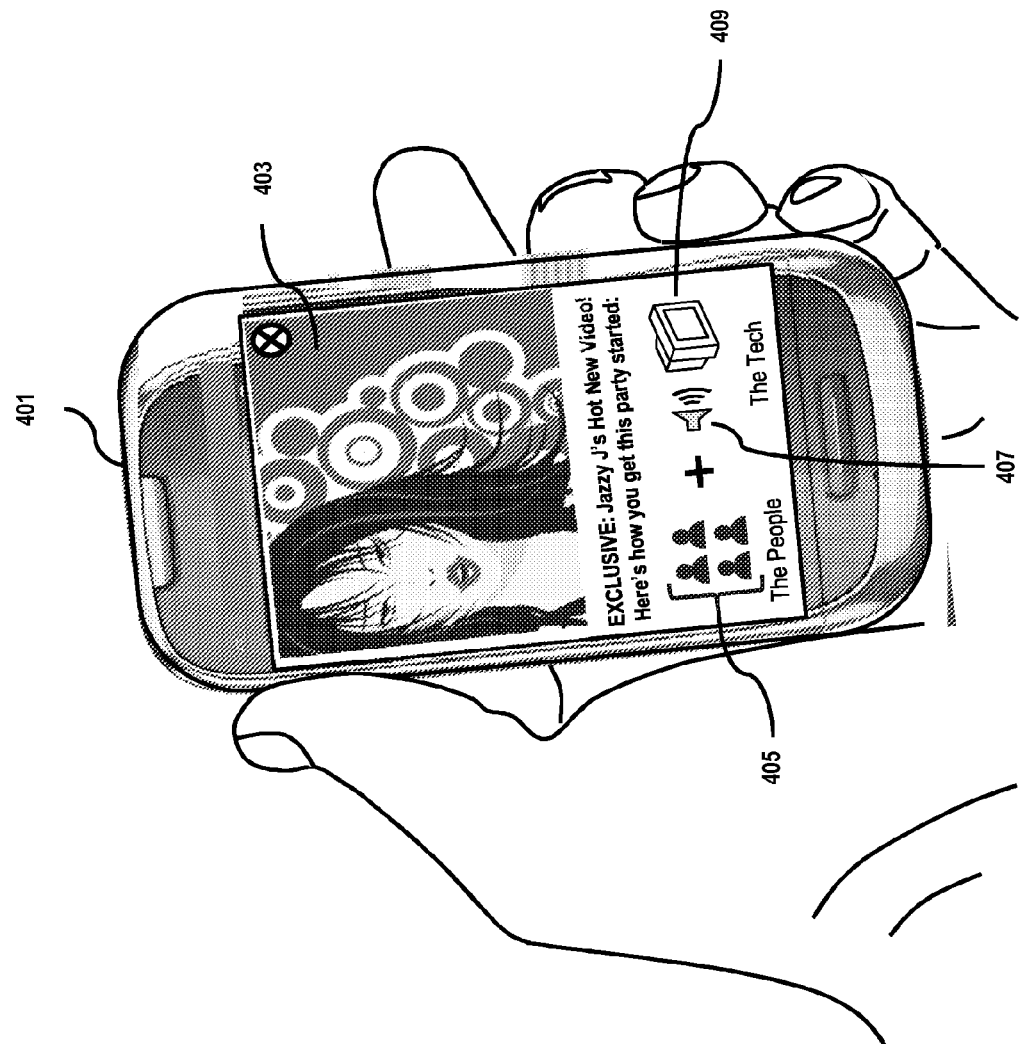
FIGS. 4A-4D are diagrams of user interfaces utilized in the processes of FIG. 3, according to various embodiments.

In FIG. 4A, the user of device 401 wishes to access video content 403 from a video content service provider. A single frame of the video content 403 is presented to the user interface, however, it is not executable (e.g., no play button is presented). In addition to the video still 403, various user interface elements are presented for indicating a status of fulfillment of the execution criteria. In this case, the user interface elements include icons 405 for representing the number of people required to enable execution of the content 403. In addition, an audio icon 407 and display icon 409 are presented for representing the roles of an audio and display device capability respectively. It is noted that the number of required participants is four, while the roles required correspond to a specific device capabilities. The execution criteria may further specify a particular manufacture, model, type or other characteristic of the audio and display related roles as well as conditional criteria for defining said roles.

Figure 4B:
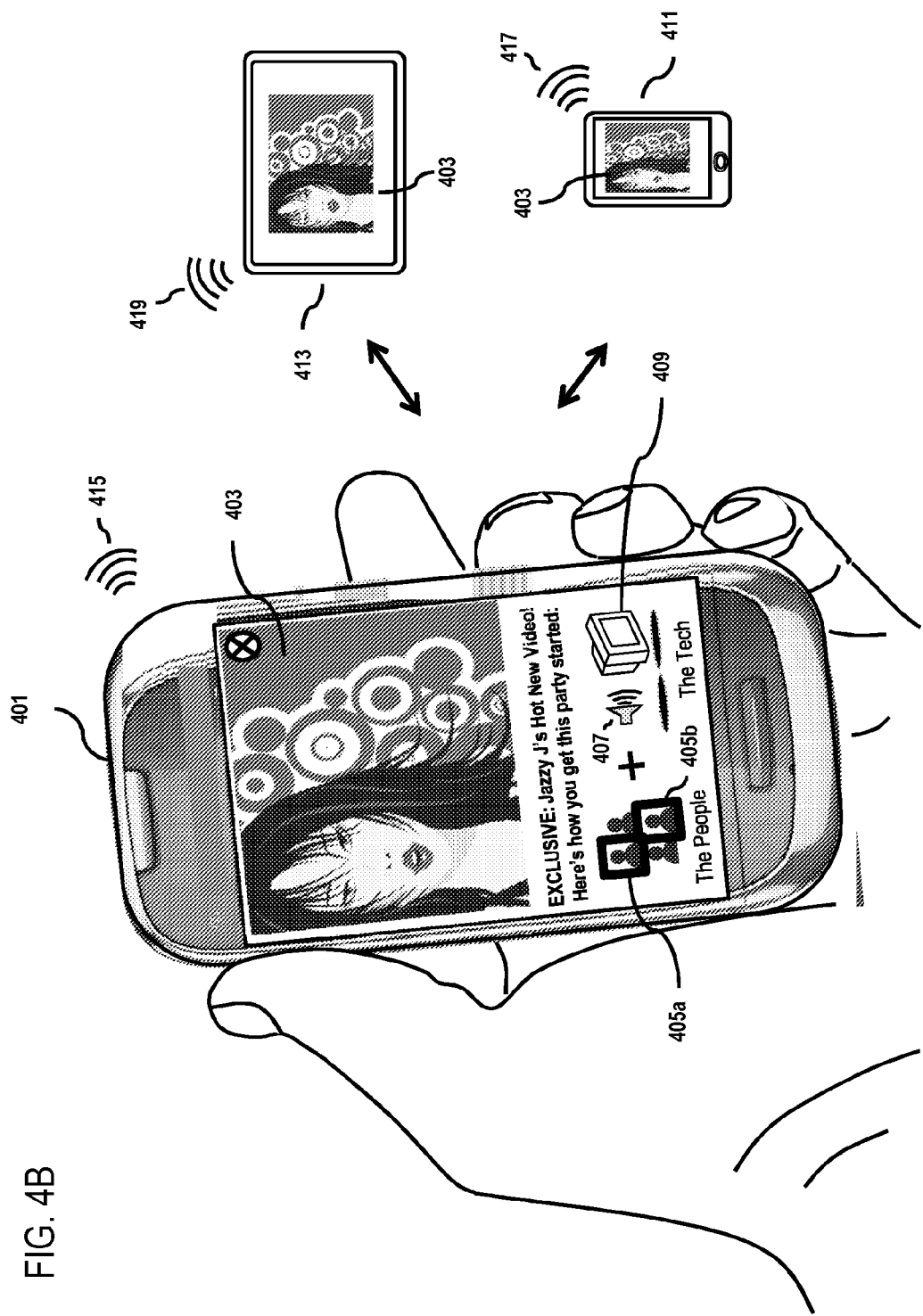

In FIG. 4B, two additional device are shown to be within proximity of user device 401. In this case, presence information is exchanged between the devices as well as with the collaboration platform 111 in order to determine short range connectivity is established. As a result of the resulting presence condition being met (along with content interaction permissions of the users), the participating devices 411 and 413 are also caused to present a single frame/still image of the video 403. As in the case of device 401, the users have no ability to execute the content as the execution requirements are still unfulfilled.

Under this scenario, however, the status information indicates that two additional users are present out of the four required. This is depicted, by way of example, via highlighted icons 405a and 405b for representing the presence of devices 411 and 413. In addition, the display role and audio device as indicated via icons 409 and 407 respectively are shown as being fulfilled, represented by way of a shadow highlighting. Consequently, the user is also able to view the number of missing devices for fulfillment of the execution criteria as well as determine fulfillment of the required roles. It is noted that additional details regarding the current status information, such as which specific device is to play a specific role, may also presented. It is also noted that the status information may or may not be presented to the user interface rendered to the participating devices 411 and 413.

In this scenario, while full execution of the video is not permitted, the platform 111 causes the audio systems of respective devices 401, 411 and 413 to render an audio sample of the music video. This is in response to execution criteria for indicating that the snippet is to be played when at least two devices are within proximity of one another and at least one is able to fulfill the required audio capability role. The audio sample is a snippet and serves as a teaser/inducement for the user of device 401 to encourage participation of at least two more users, i.e., the number indicated as missing per the execution criteria/status information. By way of example, audio signals are depicted as emanating from devices 401, 411 and 413 as signals 415, 417 and 419 respectively.

Figure 4C:
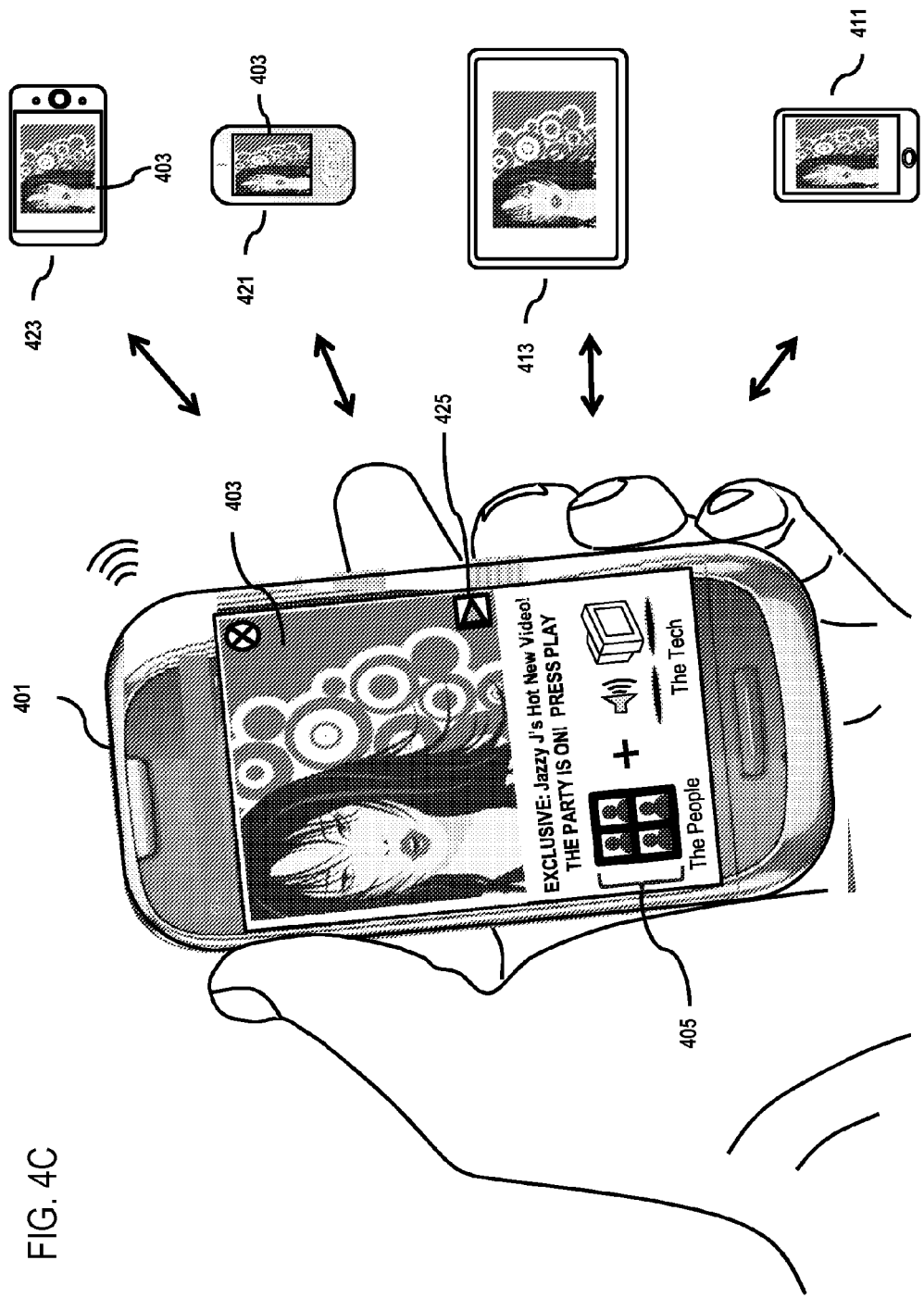

In FIG. 4C, two additional devices 421 and 423 are shown within proximity of user device 101. Consequently, the devices 421 and 423 are also caused to present, via a user interface, the same music video content 403. Furthermore, the status information for indicating fulfillment of the execution criteria is updated. Under this scenario, each of the icons 405 for representing the number of people required to enable execution of the content 403 is highlighted. As a result of the criteria being fulfilled, a PLAY action button 425 is rendered to the user interface to enable the user to execute the music video. When the user selects this button, the music video is caused to be executed at each of the devices.

Figure 4D:

In FIG. 4D, the user of device 401 is presented with various incentives and offers after viewing the music video in its entirety. Under this scenario, the offer is presented as a notification message 431 for indicating a discount offer for purchase of the album of the artist associated with the music video content 403. In addition, action buttons 427 and 429 are presented for enabling the user to initiate a purchase transaction per the discount or reject the offer respectively. It is noted that the same view may be presented to the other devices 411, 413, 421 and 423 as well.

As noted previously, the collaboration platform 111 may facilitate different means of distribution, sequencing, staging and synchronization of the content among the devices 401, 411, 413, 421 and 423. Under this scenario, for example, if a fifth user device were to join the group of devices 401, 411, 413, 421 and 423 while the music video was in execution at its halfway point, the fifth user device (not shown) would view the video from the same point of execution. By way of this approach, the video content viewing experience is the same for each of the users, thus promoting group interaction.

The exemplary techniques and systems presented herein enable content providers to combine the viral marketing techniques with the efficiency of superdistribution of content. As such, users are encouraged to elicit the participation of others in order to receive benefits associated with the content. This presents new opportunities for advertising and content sharing amongst target groups, individual members of a social networking service, etc. Still further, short range communication of the content enables and encourages both physical and digital interaction of users within proximity of one another.

The processes described herein for enabling content to be distributed based on user and device related execution criteria may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
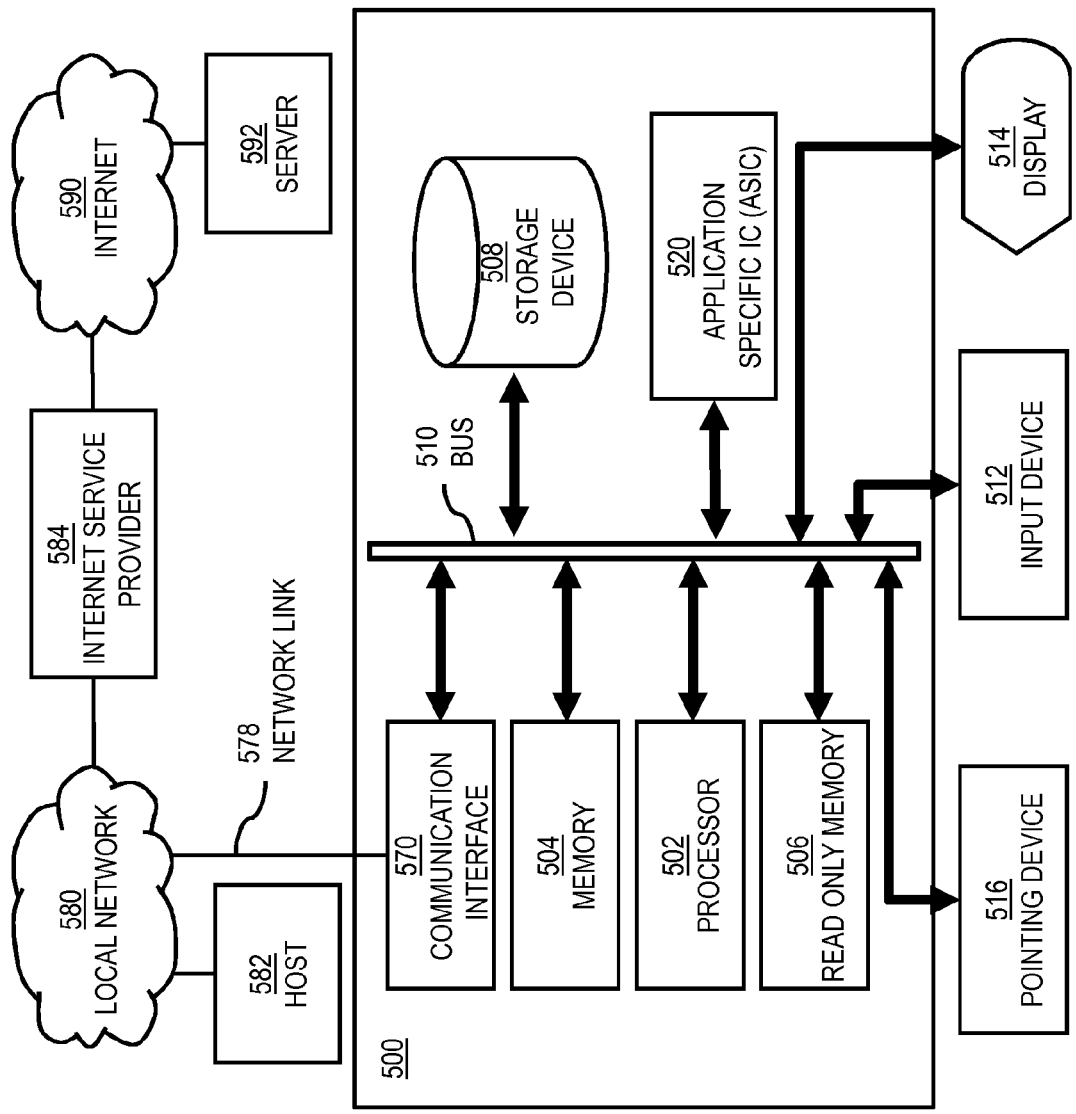
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to enable content to be distributed based on user and device related execution criteria as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of enabling content to be distributed based on user and device related execution criteria.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to enable content to be distributed based on user and device related execution criteria. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for enabling content to be distributed based on user and device related execution criteria. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for enabling content to be distributed based on user and device related execution criteria, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for enabling content to be distributed based on user and device related execution criteria to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to enable content to be distributed based on user and device related execution criteria as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of enabling content to be distributed based on user and device related execution criteria.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable content to be distributed based on user and device related execution criteria. The memory 605 also stores the data associated with or generated by the execution of the inventive steps.

Figure 7:
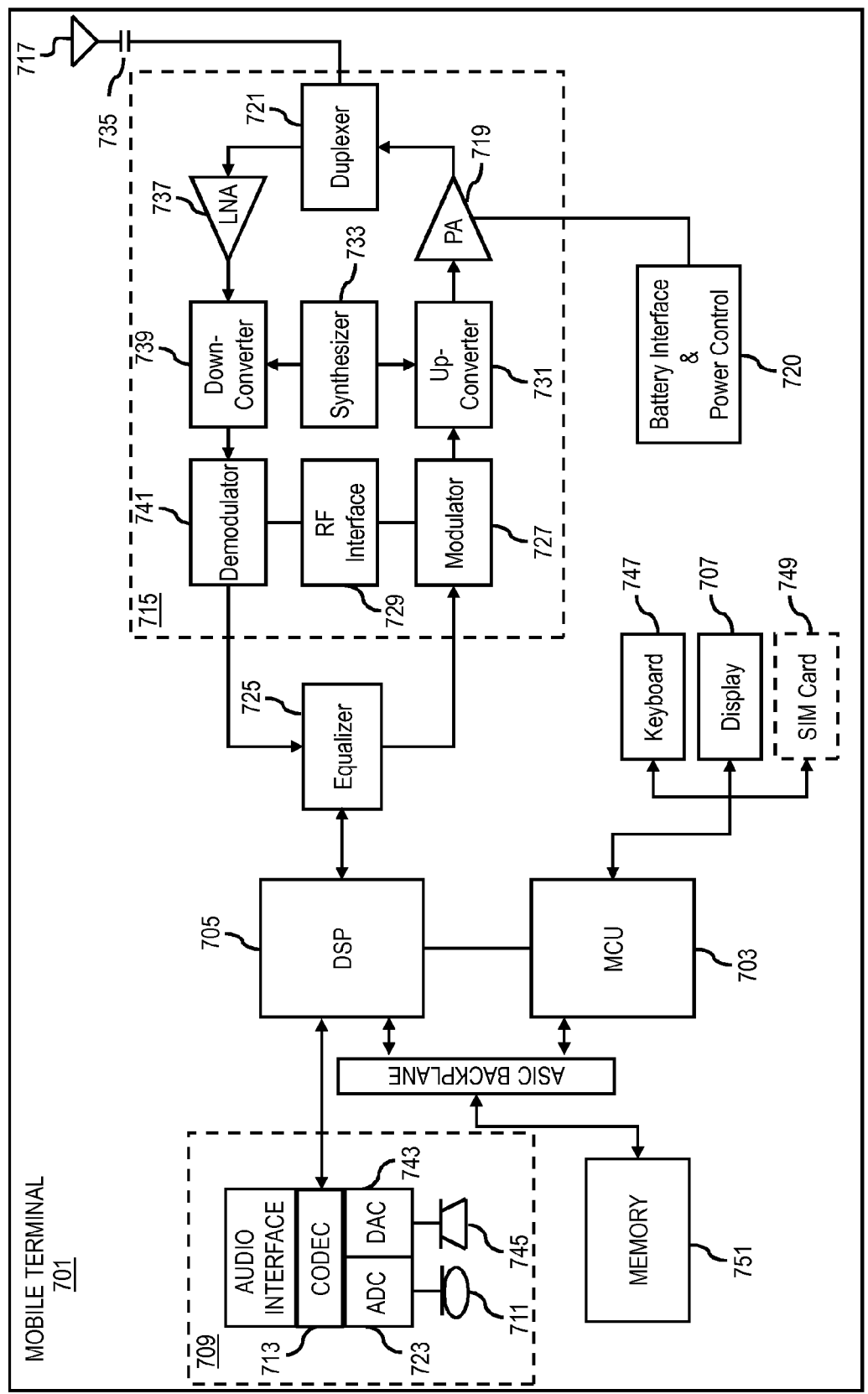
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of enabling content to be distributed based on user and device related execution criteria. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of enabling content to be distributed based on user and device related execution criteria. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to enable content to be distributed based on user and device related execution criteria. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining one or more execution criteria for at least one device based, at least in part, on presence information, capability information, characteristic information, or a combination thereof of at least one other device within proximity of the at least one device,
   wherein the presence information is of one or more users of the at least one device, the at least one other device, or a combination thereof,
   wherein the characteristic information is of the one or more users, the one or more content items, the at least one device, the at least one other device, a communication network, or a combination thereof;
   causing, at least in part, an association of the one or more execution criteria to one or more content items,
   wherein the one or more content items are multimedia content; and
   facilitating a collaborative execution of the one or more content items at the at least one device, the at least one other device, or a combination thereof based, at least in part, on the one or more execution criteria.

2. A method of claim 1, further comprising:
   determining that the at least one device, the at least one other device, or a combination thereof at least substantially satisfy the one or more execution criteria; and
   causing, at least in part, a distribution of the one or more content items, an activation of at least one feature associated with the one or more content items, or combination thereof to the at least one device, the at least one other device, or a combination thereof.

3. A method of claim 2, wherein one or more distribution rights associated with the one or more content items are independent of the one or more execution criteria.

4. A method of claim 1, wherein the one or more content items include, at least in part, on of more collaborative content items, the method further comprising:

determining one or more roles associated with the collaborative execution of the one or more collaborative content items; and determining the one or more execution criteria based, at least in part, on the one or more roles.

5. A method of claim 1, further comprising:

causing, at least in part, an assignment of the one or more roles to at least one device, the at least one other device, or a combination thereof for the collaborative execution of the one or more content items based, at least in part, on the capability information, the characteristic information, or a combination thereof.

6. A method of claim 1, further comprising:

determining the one or more execution criteria based, at least in part, on a number, one or more capability requirements, or a combination thereof of the one or more roles.

7. A method of claim 1, further comprising:

determining status information with respect to a satisfaction of the one or more execution criteria; and causing, at least in part, a presentation of one or more representations of the status information.

8. A method of claim 7, wherein the status information includes, at least in part, (a) which of the one or more content items are available for access based, at least in part, on the status information; (b) a needed number of the at least one other device for satisfying the one or more access criteria; (c) a missing number of the at least one other device for satisfying the one or more access criteria; or (d) a combination thereof.

9. A method of claim 1, further comprising:

determining at least one token for coordinating the collaborative execution of the one or more content items among the at least one device, the at least one other device, or a combination thereof.

10. A method of claim 9, wherein the collaborative execution of the one or more content items is further based, at least in part, on contextual information associated with the at least one device, the at least one other device, or a combination thereof.

11. An apparatus comprising:

circuitry including a hardware implementation comprising at least one processor and at least one memory including a computer program code, the circuitry, when in operation, causing the apparatus to:

determine one or more execution criteria for at least one device based, at least in part, on presence information, capability information, characteristic information, or a combination thereof of at least one other device within proximity of the at least one device, wherein the presence information is of one or more users of the at least one device, the at least one other device, or a combination thereof, wherein the characteristic information is of the one or more users, the one or more content items, the at least one device, the at least one other device, a communication network, or a combination thereof;

cause, at least in part, an association of the one or more execution criteria to one or more content items, wherein the one or more content items are multimedia content; and facilitate a collaborative execution of the one or more content items at the at least one device, the at least one other device, or a combination thereof based, at least in part, on the one or more execution criteria.

12. An apparatus of claim 11, wherein the apparatus is further caused to:

determine that the at least one device, the at least one other device, or a combination thereof at least substantially satisfy the one or more execution criteria; and cause, at least in part, a distribution of the one or more content items, an activation of at least one feature associated with the one or more content items, or combination thereof to the at least one device, the at least one other device, or a combination thereof.

13. An apparatus of claim 12, wherein one or more distribution rights associated with the one or more content items are independent of the one or more execution criteria.

14. An apparatus of claim 11, wherein the one or more content items include, at least in part, on of more collaborative content items, wherein the apparatus is further caused to:

determine one or more roles associated with the collaborative execution of the one or more collaborative content items; and determine the one or more execution criteria based, at least in part, on the one or more roles.

15. An apparatus of claim 11, wherein the apparatus is further caused to:

cause, at least in part, an assignment of the one or more roles to at least one device, the at least one other device, or a combination thereof for the collaborative execution of the one or more content items based, at least in part, on the capability information, the characteristic information, or a combination thereof.

16. An apparatus of claim 11, wherein the apparatus is further caused to:

determine the one or more execution criteria based, at least in part, on a number, one or more capability requirements, or a combination thereof of the one or more roles.

17. An apparatus of claim 11, wherein the apparatus is further caused to:

determine status information with respect to a satisfaction of the one or more execution criteria; and cause, at least in part, a presentation of one or more representations of the status information.

18. An apparatus of claim 17, wherein the status information includes, at least in part, (a) which of the one or more content items are available for access based, at least in part, on the status information; (b) a needed number of the at least one other device for satisfying the one or more access criteria; (c) a missing number of the at least one other device for satisfying the one or more access criteria; or (d) a combination thereof.

19. An apparatus of claim 11, further comprising:

determine at least one token for coordinating the collaborative execution of the one or more content items among the at least one device, the at least one other device, or a combination thereof.

20. An apparatus of claim 19, wherein the collaborative execution of the one or more content items is further based, at least in part, on contextual information associated with the at least one device, the at least one other device, or a combination thereof.

21. An apparatus of claim 11, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

* * * * *